United States Patent
Farrington

[19]

[11] Patent Number: 5,927,747
[45] Date of Patent: Jul. 27, 1999

[54] AIR BAG DOOR HOLD DOWN RETAINER

[75] Inventor: Stephen D. Farrington, Kingston, N.H.

[73] Assignee: Textron Automotive Company Inc., Troy, Mich.

[21] Appl. No.: 08/781,342

[22] Filed: Jan. 21, 1997

[51] Int. Cl.⁶ .................................................. B60R 21/20
[52] U.S. Cl. ........................................ 280/728.3; 280/732
[58] Field of Search ............................ 280/728.3, 728.2, 280/732, 730.1, 731, 728.1

[56] References Cited

U.S. PATENT DOCUMENTS

| | | | |
|---|---|---|---|
| 4,893,833 | 1/1990 | DiSalvo et al. | 280/732 |
| 5,199,834 | 4/1993 | Seidl et al. | 280/728.2 |
| 5,211,421 | 5/1993 | Catron et al. | 280/728.2 |
| 5,333,901 | 8/1994 | Barnes | 280/732 |
| 5,403,034 | 4/1995 | Gans et al. | 280/728.3 |
| 5,451,074 | 9/1995 | Guitarini | 280/728.3 |
| 5,460,402 | 10/1995 | Rhodes, Jr. | 280/728.3 |

FOREIGN PATENT DOCUMENTS 4-243646  8/1992  Japan ................................ 280/728.2

Primary Examiner—Peter C. English
Attorney, Agent, or Firm—Reising, Ethington, Learman & McCulloch PLLC

[57] ABSTRACT

A hold down arrangement for an air bag door closing a deployment opening of an instrument panel comprises a molded plastics receiver provided on the backside of the door formed with a bore having a wall. A threaded fastener is supported by structure of the panel and includes an externally threaded shank that is threaded into the bore to provide a strippable hold down connection sufficient to secure the door against inadvertent opening until such time as the air bag is deployed.

13 Claims, 2 Drawing Sheets

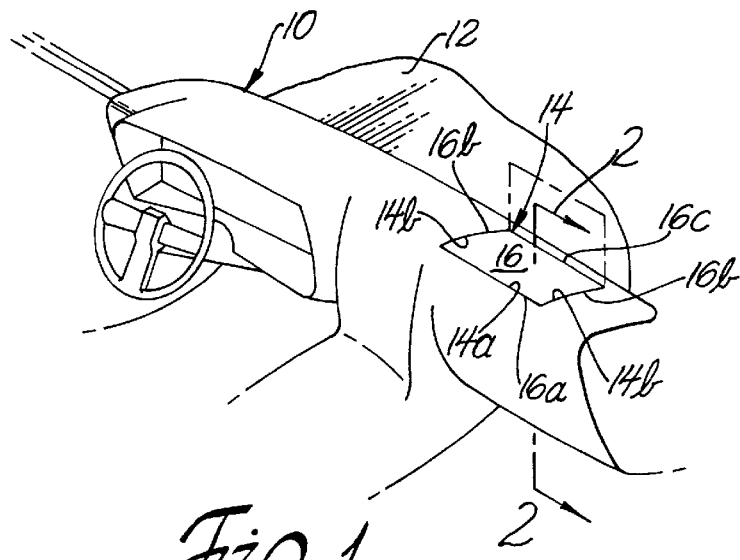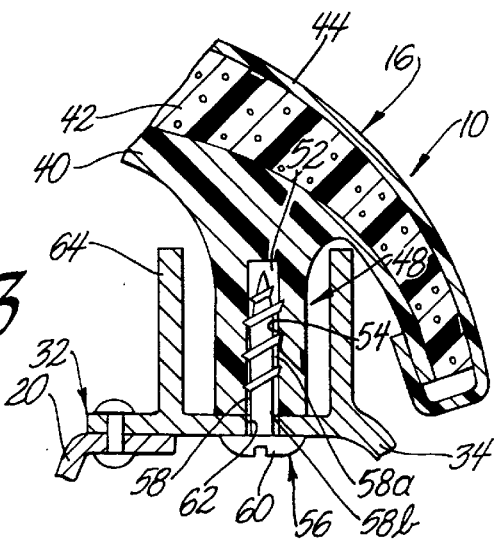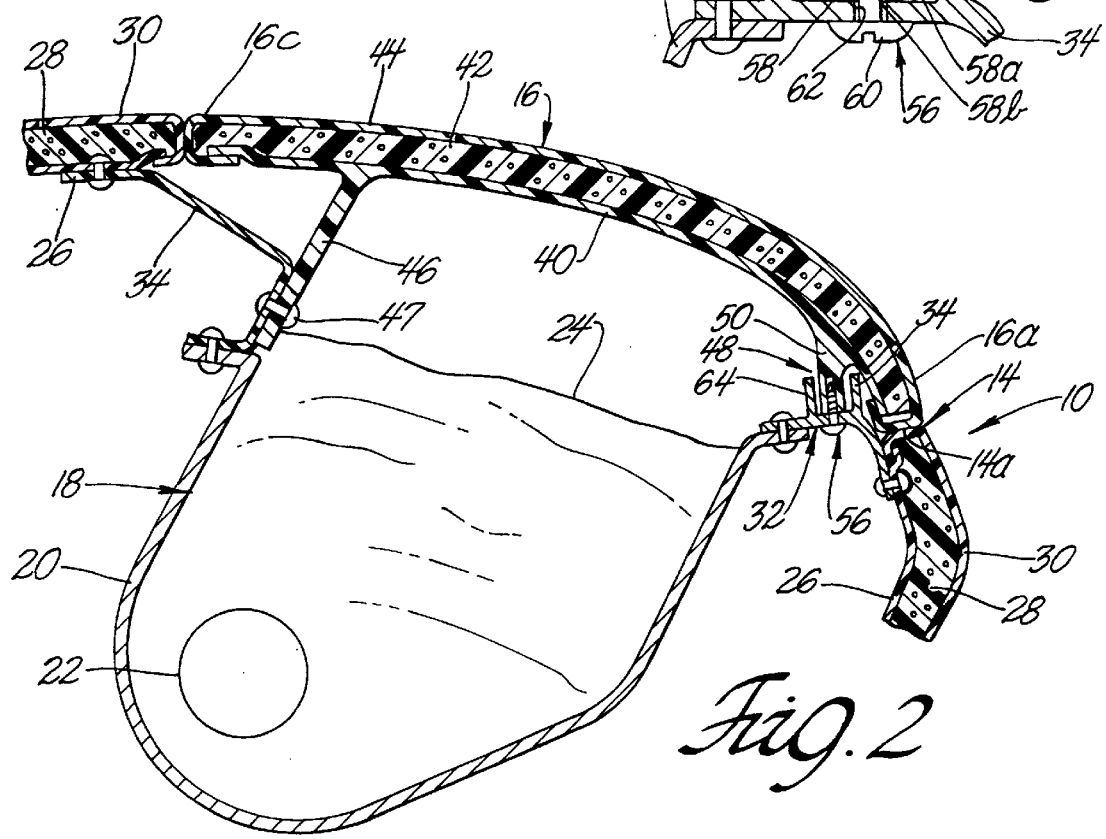

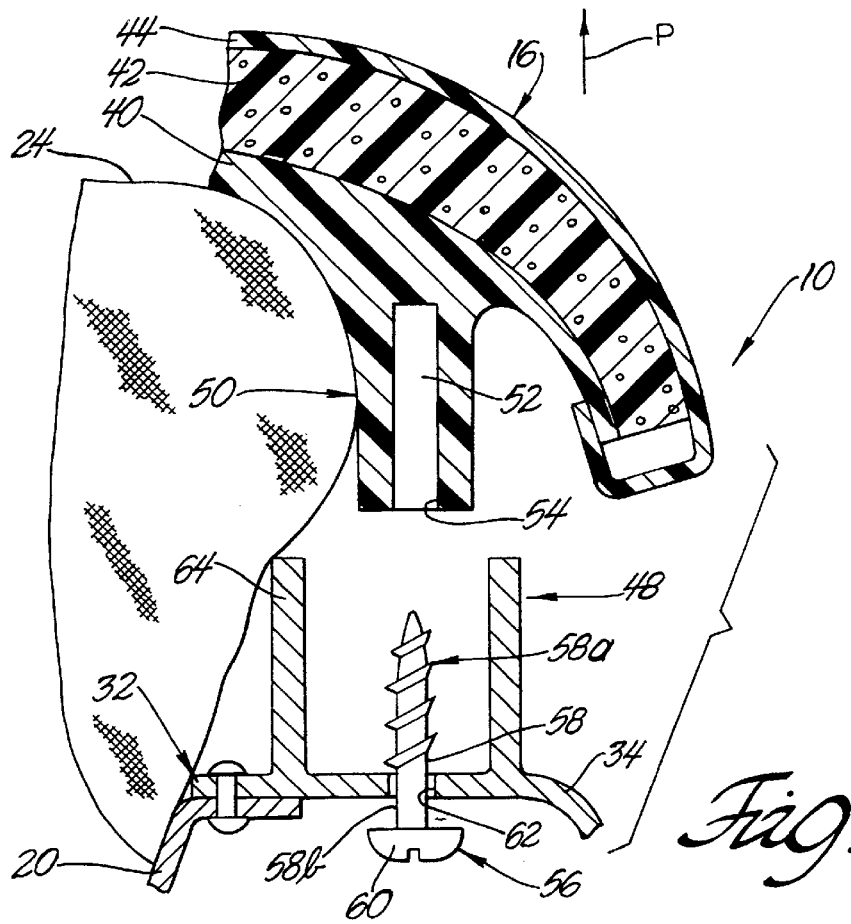
Fig. 4
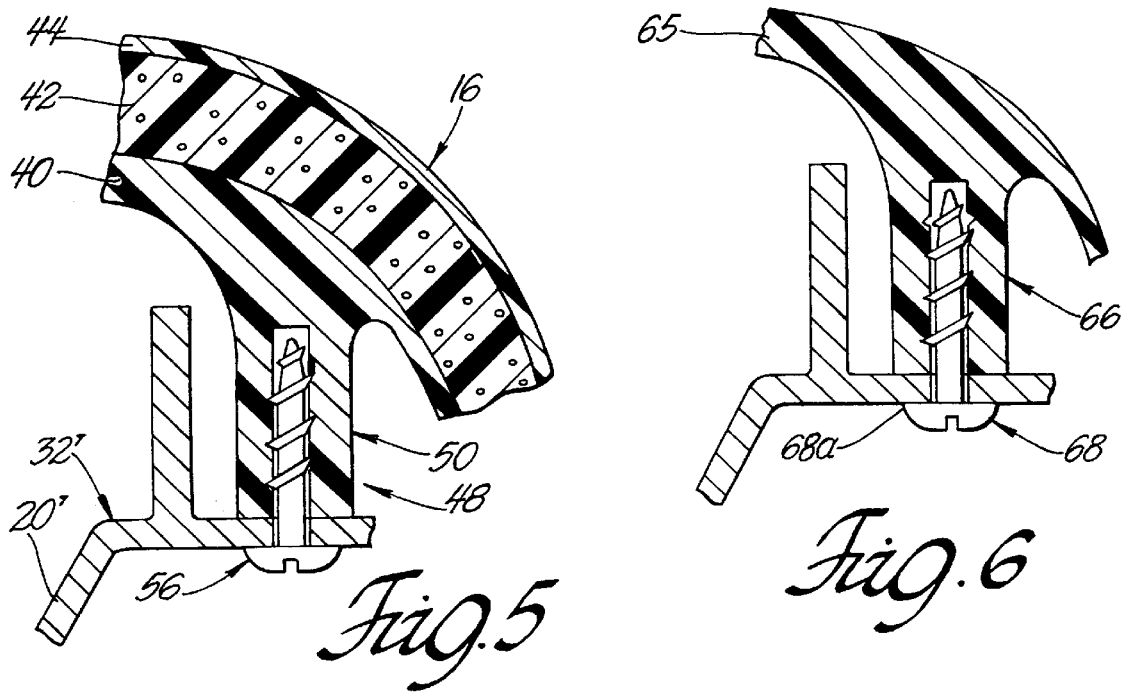
Fig. 5
Fig. 6

AIR BAG DOOR HOLD DOWN RETAINER

This invention relates generally to passenger supplemental inflatable restraint installations and more particularly to the hold down mechanism used to secure the air bag deployment door in a tamper proof closed position until such time as the air bag is deployed.

BACKGROUND OF THE INVENTION

Supplemental inflatable restraint installations in a vehicle are normally mounted beneath interior trim structure, such as the instrument panel, formed with a deployment opening through which an inflatable air bag can deploy into the passenger compartment of the vehicle when activated. Such installations require that the deployment opening be closed by a door and that the door be secured in a tamper proof closed position to prevent inadvertent opening of the door until such time as the air bag is deployed. Examples of known hold down devices include those disclosed in U.S. Pat. Nos. 4,893,833 to DiSalvo et al.; 5,211,421 to Catron et al.; 5,333,901 to Barnes; 5,403,034 to Gans et al.; and 5,460,402 to Rhodes, Jr.

Many of these prior hold down devices are of complex design requiring numerous component parts separately manufactured from the door and trim structure adding time, cost and difficulty to the manufacture and installation of the restraint system.

An air bag door hold down arrangement according to the present invention provides a very simple, low cost and yet reliable means of securing the door in a tamper proof closed position until such time as the air bag is deployed.

SUMMARY OF THE INVENTION AND ADVANTAGES

According to the invention, a hold down arrangement for an air bag deployment installation comprises at least one receiver fixed on the door having a bore with a wall and at least one associated fastener supported rotatably by the trim structure having a shank with external screw threads threaded into the bore and engaging the wall in such manner to provide a strippable hold down connection between the fastener and receiver aligned generally axially with respect to the outward opening movement of the door. The connection offers a predetermined resistance to the opening of the door sufficient to secure the door against inadvertent opening while enabling the door to open upon deployment of the air bag by causing the walls of the bore and/or external screw threads to yield and the fastener to strip out of the bore and separate from the receiver.

The approach of holding down the door in the closed position according to the present invention is unusual in that threaded connections of the type normally used in air bag installation are designed to secure parts permanently to one another, not to fail under the force of air bag deployment, as in the present case. The strippable screw connection thus provides a very simple, practical and cost effective way of securing the door in the closed position requiring a minimum number of parts which separate rather than break upon air bag deployment and remain attached to their respective door and trim structure components of the restraint system upon opening of the door.

THE DRAWINGS

These and other features and advantages of the present invention will be more fully understood and appreciated by those skilled in the art when considered in connection with the following detailed description and accompanying drawings wherein;

FIG. 1 is a perspective view of an instrument panel or dashboard which is one suitable interior trim structure for housing and providing an opening for deployment of an inflatable air bag into the passenger compartment of the vehicle;

FIG. 2 is an enlarged cross-sectional view taken generally along lines 2—2 of FIG. 1;

FIG. 3 is an enlarged fragmentary sectional view of the hold down arrangement of the invention;

FIG. 4 is a view like FIG. 3 but showing the fastener stripped free of the bore upon deployment;

FIG. 5 is a cross-sectional view of an alternative embodiment of a hold down arrangement of the invention; and FIG. 6 is a cross-sectional view of another embodiment of the invention.

DETAILED DESCRIPTION

Referring to FIG. 1 of the drawings, an interior trim structure in the preferred form of an instrument panel or dashboard unit 10 is shown extending transversely across the passenger compartment immediately rearward of the vehicle's windshield 12. An air bag deployment opening 14 is formed in the top of the instrument panel 10 in this case on the passenger side of the compartment.

Referring additionally to FIG. 2, the deployment opening 14 is closed by an air bag door 16 which conceals an air bag module 18 of the trim structure 10. The module 18 includes a reaction and deployment canister 20 which houses an inflater 22 and inflatable air bag 24 in known manner.

The instrument panel 10 includes a retaining panel or substrate 26 formed of a rigid material such as plastics or metal and covered by a layer of foam 28 and a decorative outer vinyl skin 30. The substrate 26 has a recessed flange or retaining collar portion 32 that extends at least in part about the deployment opening 14 along the rearward 14a and/or side 14b edges of the opening. The terms "rearward" and "forward" are used to designate the relative arrangement of the parts when installed in the vehicle. The flange 32 forms an abutment which is engaged by the door 16 when in closed position.

The instrument panel structure includes various structural reinforcements and brackets 34 beneath the substrate 26 which serve to secure the substrate 26 to support structure of the vehicle and mount the air bag module 18 in operative position relative to the deployment opening 14.

The air bag door 16 includes a substrate or backing panel 40 covered by a foam layer 42 and an outer vinyl skin 44 which usually is matched in color and texture to that of the skin 30 of the instrument panel 10, according to known practice. The outer skin 44 of the door can be formed, for example, from cast vinyl material by processes such as those set forth in U.S. Pat. Nos. 4,664,864 and 4,784,911, both commonly assigned to same assignee as in the present invention and incorporated herein by reference. The joining of the foam and skin to the substrate can be achieved by a molding process such as the one illustrated and described in U.S. Pat. No. 4,806,094, also commonly assigned to the same assignee as the present invention and its disclosure incorporated herein by reference.

While a foam core instrument panel is shown, the present invention can be used on any airbag door including a hard surface door or a door including a substrate having a vacuum formed cover.

The door 16 is connected to the instrument panel structure 10 adjacent the forward edge 16c of the door 16 by a connection that enables the door 16 to open yet remain attached to the instrument panel 10. FIG. 2 illustrates one such connection that can be employed comprising a T-strap hinge 46 secured or molded integrally at its upper end to the backing panel 40 of the door 16 and attached at its opposite end to the instrument panel structure such as the sheet metal reinforcements 34 or the air bag canister 20 by means of the rivets 47 or other fasteners in known manner. While a particular T-type hinge 46 is illustrated in the drawings, it is to be understood that it is shown for purposes of illustration only and that any of a number of other hinge or tether connections of types well-known to the art could be used including, for example, those of the general type disclosed in U.S. Pat. Nos. 4,893,833; 5,460,402 and 5,211,421, the disclosures of which are incorporated herein by reference.

In accordance with the present invention, a releasable hold down arrangement, indicated generally at 48, is provided which serves to hold or retain the door 16 in a tamper proof closed position within the opening 14 in a manner to prevent inadvertent opening of the door 16 until the air bag 24 is deployed. The hold down arrangement 48 comprises one or more fastener receivers 50 provided on the bottom or underside of the door 16 adjacent its rearward 16a and/or side 16b edges. Each receiver 50 has a bore 52 therein with a wall 54. In the preferred form, the receivers 50 comprise bosses molded integrally with the door substrate 40 preferably of the same plastics material as that of the substrate 40. The bore 52 is preferably generally cylindrical in shape lacking any significant reentrant contours along its length which would require the use of special mold tooling. The bore 52 can be formed, for example, by means of a pin on the mold tool which, when the mold parts are separated, would be extracted from the receiver 50 leaving behind the bore 52. The bore 52 may be somewhat narrowingly tapered along its depth to facilitate molding and to vary the holding force of the wall 54. The bore 52 extends along a longitudinal axis arranged transverse to the substrate 40 generally in line with the outward path of movement P of the door 16 as it swings outwardly of the instrument panel 10 upon deployment of the air bag 24 (FIG. 4).

Each receiver 50 has a fastener 56 associated therewith supported rotatably by the structure of the instrument panel 10. The fasteners 56 each have a shank 58 with an external helical screw threaded section 58a at one end of the fastener 56 and enlarged head 60 at the opposite end. A reduced diameter unthreaded region 58b of the shank 58 is preferably provided between the threaded section 58a and the head 60. Preferably, the flange or collar 32 of the instrument panel structure 10 is formed with apertures 62 corresponding in number to the number of fasteners 56 and in which the shank 58 of the fasteners 56 are accommodated in such manner that the fasteners 56 are able to rotate relative to the instrument panel structure 10. It is preferred that the fasteners 56 be captured by the flange 32 to retain their relative rotatability while securing the fasteners against separation from the flange 32. One way of capturing the fasteners 56 is to dispose the unthreaded sections 58b of the shanks 58 within the apertures 62 with the relatively larger head 60 and threaded section 58a arranged on opposite sides of the apertures 62 to limit the axial movement of the fasteners 56 (FIG. 4). In the preferred embodiment, the apertures 62 are dimensioned relative to the fasteners 56 to accommodate the initial threading of the threaded sections 58a therethrough to position the unthreaded section 58b within the aperture, and thereafter resist removal.

To secure the door 16 in the tamper proof closed position, the door 16 is fitted in the opening 14 and the shanks 58 of the fasteners 56 are extended into the corresponding bores 52 of the receivers 50. The fasteners 56 are then rotated causing the threaded shank sections 58a to advance into their respective bores 52 and engage the wall 54 to provide a strippable connection offering a predetermined hold down closure force that is designed to be sufficiently great to prevent inadvertent opening of the door but yet able to be overcome by the outward deployment force exerted by the air bag as it deploys. It will be appreciated that the deployment force likely will vary among different air bag designs and installations. The closure force offered by the hold down arrangement 48 can thus likewise be varied to accommodate each application. This can be accomplished in a number of ways, including adjusting the number, lead, pitch and/or size of the screw threads 58a in relation to the bores 52, or vice versa, to offer more or less resistance to the axial stripping of the fasteners 56 from the bores 52. FIGS. 3 and 4 illustrate a preferred thread configuration for the fasteners 56 wherein the threads 58a are inclined axially away from the heads 60 to lessen the resistance to pullout of the fasteners 56. Prefereably, in this embodiment, the fasteners would be typical of a metal self-tapping screw with threads designed to cut into the wall of the receiver.

Upon deployment, the air bag 24 exerts a sudden impact force on the substrate 40 of the door 16 and an axial separation force on the fasteners 56 and their receivers 50 sufficient to overcome their holding force, causing the walls 54 of the receivers 50 to yield and deform causing the fasteners 56 to strip out of the bores 52 (FIG. 4). Once separated, the receivers 50 remain attached and swing outwardly with the door 16 and the fasteners 56 remain attached to the instrument panel support structure 10.

In the embodiment of FIG. 6, an airbag door 65 has a receiver 66 that receives a threaded fastener 68 with a threaded section 68a that will rotatably engage into the receiver 66 into contact with the receiver wall. In this case, the fastener threads will yield and deform rather than the receiver wall upon airbag deployment, and the bore wall will remain relatively intact as the holding force is overcome. Thus, in this embodiment, the fastener would be typical of a plastic screw with "square" threads designed to interference fit with the receiver wall rather than cutting into it.

As illustrated best in FIG. 4, it is preferred that a guard 64 extend alongside each fastener 56 in position adjacent the deployment opening 14 so as to shield the air bag 24 from contacting the fasteners 56 as the air bag 24 deploys past the fasteners 56 through the opening 14. The guard 64 may comprise an outwardly extending flange of the instrument panel reinforcement structure 34 fore and aft of each fastener 56 to protect the airbag and a vehicle occupant during airbag deployment.

While a specific embodiment of an air bag installation has been described, it is to be understood that the hold down arrangement 48 of the present invention is applicable to any of a number of different types of air bag installation systems, including those where the door 16 is integrated with the instrument panel or is mounted on the canister of the air bag unit 18. In the latter case, the flange or collar portion 32' could comprise the mouth of the canister 20' as illustrated in FIG. 5.

It is to be understood that the foregoing description is of presently preferred embodiments of the invention and are intended to be illustrative rather than definitive thereof. The invention is defined in the dependent claims which contemplate various modifications within the spirit and scope of the invention.

We claim:

1. In an inflatable air bag deployment installation for a vehicle in which an inflatable air bag is mounted beneath an interior trim structure for escapement through a deployment opening in said trim structure that is normally closed by a door held in a tamper proof closed position by a releasable hold down arrangement which prevents inadvertent outward opening of said door until such time as the air bag is deployed, and wherein the hold down arrangement comprises:

at least one receiver fixed on said door having a bore with a wall, and at least one fastener supported rotatably by said trim structure having a shank portion with external screw threads threaded into said bore and engaging said wall; said wall and said screw threads being relatively yieldable to provide a strippable connection between said fastener and said receiver offering a predetermined resistance to the opening of said door sufficient to secure said door against inadvertent opening while enabling said door to open upon deployment of the air bag by causing either of said wall of said bore or said external screw threads to yield and said fastener to strip out of said bore and separate from said receiver.

2. The installation of claim 1 wherein said wall of said bore is deformed by said screw threads during air bag deployment.

3. The installation of claim 1 wherein said screw threads are deformed by said wall during airbag deployment.

4. The installation of claim 1 wherein said door includes a molded plastics backing panel and said receiver comprises a unitary boss molded in place on said panel.

5. The installation of claim 4 wherein said trim structure includes a recessed flange adjacent said deployment opening, said boss being positioned on said door so as to overly said flange when said door is in said closed position, and said fastener releasably interconnecting said boss and said flange.

6. The installation of claim 5 wherein said fastener is captured by said flange so as to be rotatable relative to said flange but held against removal from said flange when said fastener is disconnected from said boss.

7. The installation of claim 6 wherein said fastener includes an enlarged head at one end thereof confronting said flange and an unthreaded portion of said shank portion between said head and said screw threads portion of said shank portion accommodated within an aperture of said flange.

8. The installation of claim 7 wherein said external screw threads are inclined axially away from the head.

9. The installation of claim 1 including a guard projecting from said trim structure alongside said fastener in such position to shield the air bag from contacting said fastener as the bag deploys past said fastener and out through said deployment opening.

10. The installation of claim 9 wherein said trim structure has an occupant side; said guard being located on said occupant side.

11. An inflatable restraint deployment system for a vehicle comprising: a trim structure having a deployment opening through which an inflatable air bag may deploy; a door having a backing panel; a receiver molded integrally with said panel having a bore with a wall; and a threaded fastener supported for rotation by said trim structure having an enlarged head portion limiting axial movement of said fastener and a shank with an externally threaded portion threaded into said bore in relative yielding relationship and engaging said wall to provide a strippable releasable connection between said fastener and said receiver, said strippable connection providing sufficient holding force to secure said door in a tamper proof closed position while enabling said door to open in response to an outward deployment force exerted by the air bag by causing either of said wall of said bore or external screw threads of said threaded portion to yield to and separate said receiver from said fastener whereupon said fastener remains with said trim structure and said receiver remains with and moves outwardly with said door.

12. A method of releasably securing an air bag deployment door in a tamper proof closed position within a deployment opening in a trim structure of a vehicle to prevent the door from being inadvertently opened until such time as an air bag is deployed through the opening, said method comprising:

providing at least one receiver on the door having a bore with a wall;

providing at least one associated fastener having a shank with an external screw thread portion;

supporting the fastener for rotation on the trim structure and screwing the shank into the bore causing the screw thread portion of the shank to engage the wall of the bore establishing a strippable connection between the fastener and the receiver offering a predetermined resistance to the opening of the door sufficient to secure the door against inadvertent opening while enabling the door to open upon deployment of the air bag by causing either of the wall of the bore or the external screw thread portion to yield and the fastener to strip out of the bore and separate from the receiver.

13. The method of claim 12 including capturing the fastener on the trim structure such that the fastener is rotatable relative to the trim structure but held against removal from the trim structure.

* * * * *